(12) United States Patent
Baker et al.

(10) Patent No.: US 6,628,875 B2
(45) Date of Patent: Sep. 30, 2003

(54) OPTICAL FIBERS POSSESSING A PRIMARY COATING WITH A HIGHER DEGREE OF CURE AND METHODS OF MAKING

(75) Inventors: Linda S. Baker, Addison, NY (US); John S. Peanasky, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/086,109

(22) Filed: Feb. 27, 2002

(65) Prior Publication Data

US 2003/0059188 A1 Mar. 27, 2003

Related U.S. Application Data

(60) Provisional application No. 60/307,010, filed on Jul. 20, 2001.

(51) Int. Cl.[7] .............................................. G02B 6/22
(52) U.S. Cl. ...................................................... 385/128
(58) Field of Search ....................... 385/128; 427/163.2, 427/513

(56) References Cited

U.S. PATENT DOCUMENTS

| | | | |
|---|---|---|---|
| 4,636,405 A | | 1/1987 | Mensah et al. |
| 5,015,068 A | | 5/1991 | Petisce |
| 5,416,880 A | | 5/1995 | Edwards et al. |
| 6,018,605 A | | 1/2000 | Mills et al. |
| 6,173,102 B1 | * | 1/2001 | Suzuki et al. ................ 385/128 |
| 2002/0106173 A1 | * | 8/2002 | Stupak et al. ................ 385/128 |

FOREIGN PATENT DOCUMENTS

| | | | | |
|---|---|---|---|---|
| EP | 0646552 A2 | | 4/1995 | |
| EP | 1004551 A1 | | 5/2000 | |
| EP | 1216969 A1 | | 6/2002 | |
| JP | 01167264 | | 6/1989 | |
| WO | WO 96/31444 | * | 10/1996 | |
| WO | WO 98/47954 | | 10/1998 | ......... C08K/5/5397 |

OTHER PUBLICATIONS

"Cure Behavior of Optical Fiber Primary Coating on Drawing Tower", Yoshizawa, Junji et al., International Wire & Cable Symposium Proceedings 1999, p. 680–686 (Month unknown).

"Improvements in Efficiency of UV Curing Systems for Optical Fiber Buffer Coatings", R. W. Stowe, afp Technical Paper FC86–852, 1986 (Month unknown).

"Dichroic Reflectors Applied to High Peak Irradiance Microwave Powered UV Lamps", R. W. Stone, Fusion UV Curing Systems. Pgs. 1–10 (Date unknown).

\* cited by examiner

Primary Examiner—Rodney Bovernick
Assistant Examiner—Mike Stahl
(74) Attorney, Agent, or Firm—Timothy R. Krogh; James V. Suggs

(57) ABSTRACT

An optical fiber including: a fiber including at least a core; a primary coating substantially encapsulating the fiber, the primary coating being the cured product of a first polymerizable composition including a first photoinitiator which absorbs light within a range of the UV spectrum; and a secondary coating substantially encapsulating the primary coating on the fiber, the secondary coating being the cured product of a second polymerizable composition including a second photoinitiator which also absorbs light within the range of the UV spectrum, wherein an average integrated intensity for the second photoinitiator is 95% or less of the average integrated intensity for the primary photoinitiator over at least a portion of the range of the UV spectrum. Also disclosed are fiber optic ribbons including the optical fibers, methods of making the optical fibers, and methods of increasing the degree of cure for a primary coating on an optical fiber.

57 Claims, 4 Drawing Sheets

OPTICAL FIBERS POSSESSING A PRIMARY COATING WITH A HIGHER DEGREE OF CURE AND METHODS OF MAKING

CROSS-REFERENCE TO RELATED APPLICATIONS

This application claims the benefit of U.S. Provisional Application Serial No. 60/307,010, filed Jul. 20, 2001 entitled OPTICAL FIBERS POSSESSING A PRIMARY COATING WITH A HIGHER DEGREE OF CURE AND METHODS OF MAKING, by John S. Peanasky and Linda Baker.

FIELD OF THE INVENTION

The present invention relates generally to a method of improving the degree of cure for a primary coating applied onto a fiber core and optical fibers prepared according to the method.

BACKGROUND OF THE INVENTION

A typical geometry for an optical fiber is characterized by a cylindrical core at the center of the fiber, a cylindrical clad surrounding the core (with the core and clad together forming the glass fiber), a primary or inner coating which surrounds the clad, and a secondary or outer coating which surrounds the primary coating. The primary coating is applied directly to the glass fiber and, when cured, forms a soft, elastic, and compliant material which encapsulates the glass fiber. The primary coating serves as a buffer to cushion and protect the glass fiber when the fiber is bent, cabled, or spooled. The secondary coating is applied over the primary coating and functions as a tough, protective outer layer that prevents damage to the glass fiber during processing and use.

One approach for preparing optical fibers utilizes a dual-coating system, whereby the primary coating material is applied to a glass fiber and the primary coating is cured, and then a secondary coating material is applied to the primary-coated fiber and the secondary coating is cured. This process is known as a wet-on-dry coating procedure. An alternate approach for preparing optical fibers also utilizes a dual-coating system, but instead the primary coating material is applied to a glass fiber followed by application of the secondary coating material and then curing of both the primary and second coatings simultaneously. This process is known as a wet-on-wet coating procedure. Both wet-on-dry and wet-on-wet coating procedures currently are rate-limited by the degree of cure for the primary coating. For the wet-on-dry process, the primary-coated fiber cannot be handled or further coated until the primary coating has sufficiently cured. Even so, because of the low cure for the primary coating, it has a lower effective modulus and is prone to defects. Similarly, even for the wet-on-wet process, further handling and processing of the coated optical fiber cannot occur until the primary coating has sufficiently cured. These too are prone to defects.

Thus, it would be desirable (i.e., cost-effective) to utilize primary coating compositions which achieve a higher degree of cure more quickly, thereby allowing for an increase in the processing speed of fiber production along with a reduction in the number and/or severity of fiber defects caused by handling and processing of optical fibers.

The present invention is directed to overcoming the above-described deficiencies in the art.

SUMMARY OF THE INVENTION

A first aspect of the present invention relates to an optical fiber including: a fiber including at least a core; a primary coating substantially encapsulating the fiber, the primary coating being the cured product of a first polymerizable composition including a first photoinitiator which absorbs light within a range of the UV spectrum; and a secondary coating substantially encapsulating the primary coating on the fiber, the secondary coating being the cured product of a second polymerizable composition including a second photoinitiator which also absorbs light within the range of the UV spectrum, wherein an average integrated intensity for the second photoinitiator is 95% or less of the average integrated intensity for the primary photoinitiator over at least a portion of the range of the UV spectrum.

A second aspect of the present invention relates to a method of making an optical fiber which includes: first coating a fiber with a first polymerizable composition including a first photoinitiator which absorbs light within a range of the UV spectrum; second coating the coated fiber with a second polymerizable composition including a second photoinitiator which also absorbs light within the range of the UV spectrum, wherein an average integrated intensity for the second photoinitiator is 95% or less of the average integrated intensity for the primary photoinitiator over at least a portion of the range of the UV spectrum; and exposing the twice coated fiber to a UV light source under conditions effective to promote curing of the first and second polymerizable compositions, thereby forming an optical fiber.

A third aspect of the present invention relates to an optical fiber made in accordance with any method of making an optical fiber as recited in this application.

A fourth aspect of the present invention relates to a method of increasing the degree of cure for a primary coating on an optical fiber. This method includes: coating an optical fiber with first and second polymerizable compositions, the first polymerizable composition including a first photoinitiator which absorbs light within a range of the UV spectrum and the second polymerizable composition including a second photoinitiator which absorbs light within the range of the UV spectrum, wherein an average integrated intensity for the second photoinitiator is 95% or less of the average integrated intensity for the primary photoinitiator over at least a portion of the range of the UV spectrum; and exposing the twice coated optical fiber to a UV light source under conditions effective to promote curing of the first and second polymerizable compositions, wherein the differential integrated intensity for the first and second photoinitiators increases the exposure of the first polymerizable composition to UV light, thereby increasing the degree of cure for the primary coating.

A fifth aspect of the present invention relates to an optical fiber ribbon or bundle which includes a plurality of substantially aligned optical fibers of the present invention and a matrix encapsulating the plurality of optical fibers.

A number of benefits are realized in connection the with products and methods of the present invention. First, by increasing the primary degree of cure for primary coating compositions, the cure speed of the primary coating is also increased by a comparative amount. As demonstrated herein, an approximately 10 percent increase in the primary degree of cure consequently resulted in an approximately 10 percent increase in the cure speed for the primary coating. This increase in cure speed can effectively be translated into higher processing speeds, enabling the production of larger quantities of optical fiber. Second, the resulting optical fiber is qualitatively enhanced by virtue of its increased degree of cure. This results in an optical fiber that can better tolerate handling (i.e., spooling and de-spooling), particularly before aging of the optical fiber, with reduced risk for causing fiber defects.

DETAILED DESCRIPTION OF THE INVENTION

Figure 1:
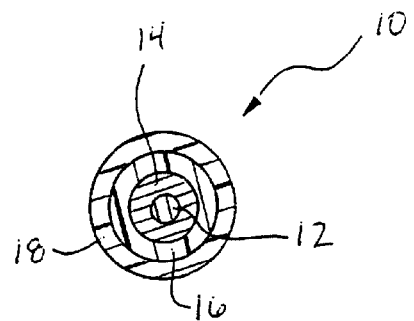
FIG. 1 is a cross-sectional view of an optical fiber of the present invention.

One aspect of the present invention relates to an optical fiber illustrated in FIG. 1. The optical fiber 10 includes a fiber having a core 12 and, optionally, one or more cladding layers 14, a primary coating 16 substantially encapsulating the fiber, and a secondary coating 18 substantially encapsulating the primary coating on the fiber.

The primary coating is the cured product of a first polymerizable composition which includes a first photoinitiator that absorbs light within a range of the UV spectrum. As used herein, "UV spectrum" refers to light having a wavelength of from about 150 nm to about 420 nm. The range of the UV spectrum in which the first photoinitiator absorbs UV light is preferably between at least about 190 nm and about 420 nm, more preferably at least about 250 nm and about 420 nm, most preferably at least about 300 to about 420 nm.

The secondary coating is the cured product of a second polymerizable composition which includes a second photoinitiator. The second photoinitiator is selected such that the average integrated intensity for the second photoinitiator is 95% or less of the average integrated intensity for the primary photoinitiator over at least a portion of the range of the UV spectrum in which the first photoinitiator absorbs light. Preferably, the average integrated intensity of the second photoinitiator is 90% or less, more preferably 85% or less, even more preferably 80% or less, of the average integrated intensity for the primary photoinitiator over at least the portion of the range of the UV spectrum in which the first photoinitiator absorbs light.

The integrated intensity of a photoinitiator is a measure of its absorbance properties within the UV spectrum, particularly the range of the UV spectrum in which the first photoinitiator absorbs UV light. The integrated intensity is a measure of the area under the absorbance spectrum. As used herein, "average integrated intensity" refers to the integrated intensity of the photoinitiator, normalized by the thickness of the coating (i.e., primary or secondary).

Enhancing the primary degree of cure of the primary coating can be achieved when the average integrated intensity of the secondary photoinitiator is 95% or less (preferably 90% or less, more preferably 85% or less, and even more preferably 80% or less) of the average integrated intensity of the first photoinitiator within the portion of range of the UV spectrum in which the first photoinitiator absorbs light. This can be achieved using two distinct approaches or a combination thereof.

In a first approach, both the first and second photoinitiators absorb light within the same range of UV light, yet the second photoinitiator absorbs less light than the first photoinitiator within at least a portion of that range, with the second photoinitiator having an average integrated intensity of 95% or less (preferably 90% or less, more preferably 85% or less, and even more preferably 80% or less) of the average integrated intensity of the first photoinitiator within the portion thereof.

In a second approach, the range in which the first and second photoinitiators absorb UV light are different, such that a window exists within a portion of the range in which the first photoinitiator absorbs light where the second photoinitiator absorbs substantially no light (i.e., absorbance of less than about 0.0005 per $\mu$m).

In a third approach, both of the situations described in the first two approaches are present. Hence, in a first portion of the range in which the first photoinitiator absorbs UV light, both the first and second photoinitiators absorb UV light but the average integrated intensity of the second photoinitiator is 95% or less (preferably 90% or less, more preferably 85% or less, and even more preferably 80% or less) of the average integrated intensity of the first photoinitiator within the first portion of the UV range; and in a second portion of the range in which the first photoinitiator absorbs UV light, the second photoinitiator absorbs substantially no light (i.e., absorbance of less than about $0.0005/\mu$m).

According to one embodiment, the first photoinitiator is characterized by a average integrated intensity of greater than about $0.001/\mu$m within the range of about 370 to about 420 nm, whereas the second photoinitiator is characterized by an integrated intensity greater than about $0.001/\mu$m within the range of about 370 to about 410 nm. The second photoinitiator is characterized by an average integrated intensity of about 80% of the average integrated intensity of the first photoinitiator over most of the range of 370 nm to 420. However, the second photoinitiator absorbs substantially no UV light within the window of about 410 nm to about 420 nm; the proportional average integrated intensity is much less than 80% within this window. As a result, the vast majority of UV light within this window reaches the primary coating to enhance its curing.

When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent. The photoinitiator, when used in a small but effective amount to promote radiation cure, should provide reasonable cure speed without causing premature gelation of the coating composition. A desirable cure speed is any speed sufficient to cause substantial curing of the coating composition. As measured in a dose versus modulus curve, a suitable UV dose for coating thicknesses of about 25–35 μm is, e.g., less than 1.0 J/cm², preferably less than 0.5 J/cm².

Suitable first photoinitiators include, without limitation, bisacylphosphine oxide (BAPO), α hydroxy ketones, and combinations thereof. Photoinitiators containing BAPO include Irgacure 819 and Irgacure 1850, both of which are available from Ciba Specialty Chemical (Tarrytown, N.Y.). Photoinitiators containing α hydroxy ketones include Irgacure 184, which is available from Ciba Specialty Chemical.

One suitable second photoinitiator includes, without limitation, monoacylphosphine oxide (MAPO), such as Lucirin TPO which is available from BASF Corp. (Mount Olive, N.J.).

A preferred pairing of first and second photoinitiators, in the first and second coating compositions, is a BAPO-containing photoinitiator and MAPO-containing photoinitiator, respectively.

The first and second polymerizable compositions are formed using standard techniques and ingredients for preparing coating compositions. Such coating compositions typically include one or more monomeric components and, optionally, one or more oligomeric components.

When utilized, the oligomeric component of the polymerizable composition can include a single type of oligomer or it can be a combination of two or more oligomers. If used, the oligomer is preferably capable of addition polymerization (e.g., an ethylenically unsaturated oligomer). Suitable oligomers can be either monofunctional oligomers or polyfunctional oligomers, although polyfunctional oligomers are preferred. The oligomeric component can also be a combination of a monofunctional oligomer and a polyfunctional oligomer. Oligomers employed in the compositions of the present invention can contain acrylate, methacrylate, acrylamide, N-vinyl amide, styrene, vinyl ether, vinyl ester, or other known functional groups on a polyether-, polyester-, polycarbonate-, polyamide-, polyurethane-, or polyurea-diisocyanate backbone. Exemplary oligomers of this type are described in U.S. Provisional patent application Ser. No. 09/722,895 to Sheng et al. filed Nov. 27, 2000, and U.S. patent application Ser. No. 09/301,814 to Fewkes et al., filed Apr. 29, 1999, now U.S. Pat. No. 6,316,516, which are hereby incorporated by reference in their entirety.

Urethane acrylate oligomers are conventionally provided by reacting an aliphatic or aromatic diisocyanate with a dihydric polyether or polyester, most typically a polyoxyalkylene glycol such as a polyethylene glycol. Such oligomers typically have 4–10 urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., which are hereby incorporated by reference in their entirety, describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2–250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system. Polycarbonate components can also be incorporated in oligomers prepared by these methods.

The monomeric component of the polymerizable composition can include a single monomer or it can be a combination of two or more monomers. Although not required, it is preferable that the monomeric component be a combination of two or more monomers when the composition is substantially devoid of an oligomeric component. Preferably, the monomer is an ethylenically unsaturated monomer. Ethylenically unsaturated monomers may contain various functional groups which enable their cross-linking. The ethylenically unsaturated monomers are preferably polyfunctional (i.e., each containing two or more functional groups), although monofunctional monomers can also be introduced into the composition. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers). Exemplary monomers of this type are described in U.S. Provisional patent application Ser. No. 09/722,895 to Sheng et al. filed Nov. 27, 2000, and U.S. patent application Ser. No. 09/301,814 to Fewkes et al., filed Apr. 29, 1999, which are hereby incorporated by reference in their entirety.

In general, individual monomers capable of about 80% or more conversion (i.e., when cured) are more preferred than those having lower conversion rates. The degree to which monomers having lower conversion rates can be introduced into the composition depends upon the particular requirements (i.e., strength) of the resulting cured product. Typically, higher conversion rates will yield stronger cured products.

Most suitable monomers are either commercially available or readily synthesized using reaction schemes known in the art. For example, most monofunctional monomers can be synthesized by reacting an appropriate alcohol or amide with an acrylic acid or acryloyl chloride according to synthesis schemes known in the art.

As noted above, the coating compositions used in practicing the present invention are those which include photoinitiators of the type described above. In addition, the compositions may also contain other polymerization initiators, including thermal initiators, chemical initiators, electron beam initiators, microwave initiators, and actinic-radiation initiators.

The various coating compositions can also contain an additive or a combination of additives. Suitable additives include, without limitation, antioxidants, catalysts, lubricants, low molecular weight non-crosslinking resins, adhesion promoters (U.S. Pat. No. 5,146,531 to Shustack and U.S. patent application Ser. No. 09/301,814 to Fewkes et al., filed Apr. 29, 1999, which are hereby incorporated by reference in their entirety), tackifiers (U.S. patent application Ser. No. 09/476,151 to Fewkes et al., filed Dec. 30, 1999, now U.S. Pat. No. 6,326,416, which is hereby incorporated by reference in its entirety), and stabilizers. Some additives can operate to control the curing process, thereby affecting the physical properties (e.g., modulus, glass transition temperature) of the resulting coating. Others can affect the integrity of the resulting coating by protecting, for example, against de-polymerization or oxidative degradation.

A number of suitable primary and secondary coating compositions are commercially available from various vendors, such as DSM Desotech (Elgin, Ill.). By properly selecting such coating compositions on the basis of their photoinitiators, different combinations of such coating compositions can be used to prepare optical fibers in a manner described herein, affording a higher degree of cure for the primary coating.

Another aspect of the present invention relates to a method of making an optical fiber of the present invention.

The fiber, with its core and cladding layer, is typically produced in a single operation by methods which are well known in the art using known equipment, such as a draw tower. Fibers are preferably, though not exclusively, formed of glass or glass ceramic materials. Suitable methods for forming the fiber include: double crucible procedures as described, for example, in Midwinter, *Optical Fibers for Transmission*, New York, John Wiley, pp. 166–178 (1979), which is hereby incorporated by reference in its entirety; rod-in-tube procedures; and doped deposited silica processes, also commonly referred to as chemical vapor deposition ("CVD") or vapor phase oxidation.

In the double-crucible method, a single fiber is drawn from a pair of crucibles containing, respectively, the core glass material and the clad layer glass material. The crucibles are provided such that apertures or orifices therein are concentrically aligned above one another. For example, as the melt of the core glass material flows from the orifice of one crucible, it contacts and is surrounded by the melt of the clad glass material such that the combined melts flow from the orifice of the second crucible. The glass fiber is then drawn from the combined melts flowing from the orifice of the second crucible. The double-crucible method is desirable, because it avoids the need to prepare preforms.

A variety of CVD processes are known and are suitable for producing preforms which contain core and cladding layer materials. They include external CVD processes (Blakenship et al., "The Outside Vapor Deposition Method of Fabricating Optical Waveguide Fibers," *IEEE J. Quantum Electron.*, 18:1418–1423 (1982), which is hereby incorporated by reference in its entirety), axial vapor deposition processes (Inada, "Recent Progress in Fiber Fabrication Techniques by Vapor-phase Axial Deposition," *IEEE J. Quantum Electron.* 18:1424–1431 (1982), which is hereby incorporated by reference in its entirety), and modified CVD or inside vapor deposition (Nagel et al., "An Overview of the Modified Chemical Vapor Deposition (MCVD) Process and Performance," *IEEE J. Quantum Electron.* 18:459–476 (1982), which is hereby incorporated by reference in its entirety).

Once the cylindrical preform is prepared, it is locally and symmetrically heated to a temperature, e.g., of about 2000° C. As the preform is heated, such as by feeding the preform into and through a furnace, a glass fiber is drawn from the molten material.

Figure 2:
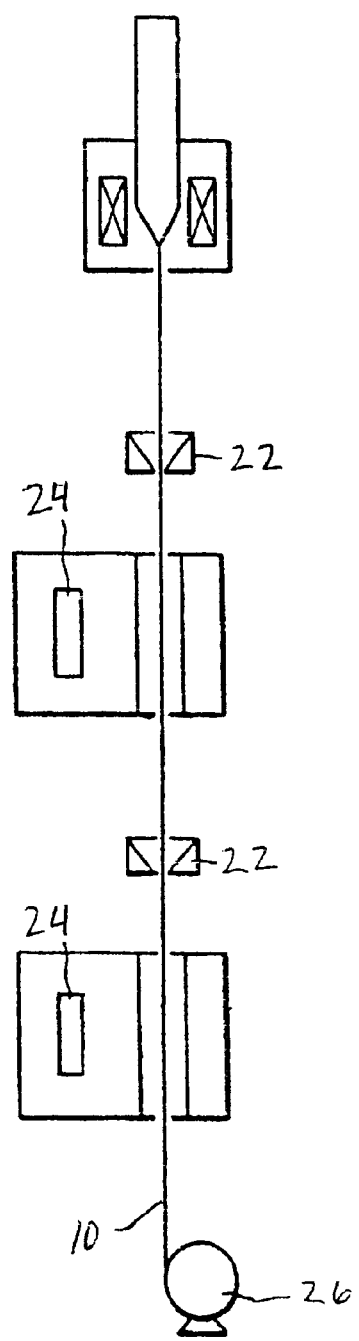
FIG. 2 is a schematic of the process for preparing an optical fiber of the present invention.

Regardless of the approach for preparing the glass fiber, the primary, secondary, or other coating compositions are applied to the glass fiber, preferably immediately after cooling. Briefly, as illustrated in FIG. 2, the manufacturing process involves drawing the fiber, coating the fiber with a polymerizable coating by a coating device 22 which includes, for example, a die and a point, curing the coating within a curing device 24 to thereby provide a single coating layer or a plurality of coating layers, and then the optical fiber is taken up by a take-up device 26.

The coating procedure of the present invention can be either a wet-on-dry process or a wet-on-wet process.

In the wet-on-dry process, the coating procedure can include coating a fiber with a first polymerizable composition as defined above, exposing the coated fiber to a UV light source under conditions effective to promote curing of first polymerizable composition, thereby forming a primary coated fiber comprising a partially cured primary coating which substantially encapsulates the fiber, second coating the primary coated fiber with a second polymerizable composition as defined above, and then exposing the coated fiber to a UV light source under conditions effective to promote curing of the second polymerizable composition and further curing of the partially cured primary coating, thereby forming an optical fiber.

In the wet-on-wet process, the coating procedure can include coating a fiber with a first polymerizable composition as defined above, second coating the primary coated fiber with a second polymerizable composition as defined above, and then exposing the coated fiber to a UV light source under conditions effective to promote curing of the first and second polymerizable compositions, thereby forming an optical fiber. One method of applying dual layers of coating compositions to a moving glass fiber is disclosed in U.S. Pat. No. 4,474,830 to Taylor, which is hereby incorporated by reference in its entirety. Another method for applying dual layers of coating compositions onto a glass fiber is disclosed in U.S. Pat. No. 4,581,165 to Rannell et al., which is hereby incorporated by reference in its entirety.

The coating process is typically affected by passing the glass fiber (or previously coated fiber) through a container which includes the particular coating composition to be applied. Thereafter, the thickness of the coating composition is adjusted (i.e., to about 25 to 35 nm) by passing the coated fiber through a die prior to curing as described above.

Curing of the coating is achieved using a UV light source to activate the photoinitiators as well as any other appropriate medium (i.e., if other polymerization initiators are included in the composition). A preferred UV light source is a D-bulb available from Fusion UV Systems (Gaithersburg, Md.). The UV light source can be the same for both curing operations in a wet-on-dry process (i.e., during the first and second exposing steps for curing of the primary and secondary coatings).

In addition to using a combination of photoinitiators in the first and second coating compositions, other steps can also be taken in order to further promote the degree of cure for the primary coating. These steps, described hereinafter, can be used alone or in combination with one another.

According to one approach, the first polymerizable composition is cooled either after it is applied to the glass fiber (i.e., after the first coating operation), during its exposure to the UV light source (i.e., during its transition to the primary coating), or both. Cooling of the first polymerizable composition (as well as the primary coating) can be effected by passing a gas over the coated fiber under conditions effective to cool the temperature of the first polymerizable composition. The gas can be any gas which is substantially inert (i.e., non-oxidative) with respect to components of the first polymerizable composition. Suitable gases include, without limitation, nitrogen, argon, helium, carbon dioxide, or combinations thereof. A UV cure tube of the type which can be used for cooling the first polymerizable composition is disclosed in U.S. Pat. No. 4,636,405 to Mensah et al., which is hereby incorporated by reference in its entirety.

According to another approach, the exposure of the first polymerizable composition to infrared energy is inhibited during the exposure of the coated fiber to the UV light source. Reducing exposure to infrared energy can be achieved by employing an infrared filter positioned between the UV light source and the coated fiber. Suitable infrared filters include water with or without infrared absorbing materials like $CuSO_4$, $CoCl_2$, or the like, as well as micro-thin (i.e., less than 500 μm) layers of gold. The use of such infrared filters in a UV cure tube is disclosed in U.S. Pat. No. 4,636,405 to Mensah et al., which is hereby incorporated by reference in its entirety.

According to yet another approach, the exposure of the first polymerizable composition to infrared energy is inhibited by employing within the UV cure tube a dichroic mirror which absorbs non-UV light. The dichroic mirror is positioned on the side of the fiber which is opposite the UV light source, whereby UV light emitted by the UV light source is re-directed to the fiber and its coating(s) and non-UV light is absorbed. Non-UV absorbing dichroic mirrors can by purchased from Fusion UV Systems.

Yet another aspect of the present invention relates to a method of increasing the degree of cure for a primary coating on an optical fiber. This method is carried out by preparing the optical fiber as described above. When performed as the wet-on-dry process described above, the exposing to the UV light source immediately after coating with the first polymerizable composition at least partially cures the primary coating and the exposing to the UV light source immediately after coating with the second polymerizable composition increases the degree of cure of the primary coating. When performed as a wet-on-wet process described above, the exposure to the UV light source is sufficient to cure both the primary and secondary coating simultaneously, but because of their differential average integrated intensity (i.e., 95% or less) the degree of cure for the primary coating is increased.

The various approaches to further promote the degree of cure for the primary coating (i.e., cooling the composition or reducing infrared exposure) can also be performed individually or in combination.

A still further aspect of the present invention relates to a fiber optic ribbon or bundle that includes a plurality of substantially aligned optical fibers of the present invention and a matrix encapsulating the plurality of optical fibers.

Figure 3:
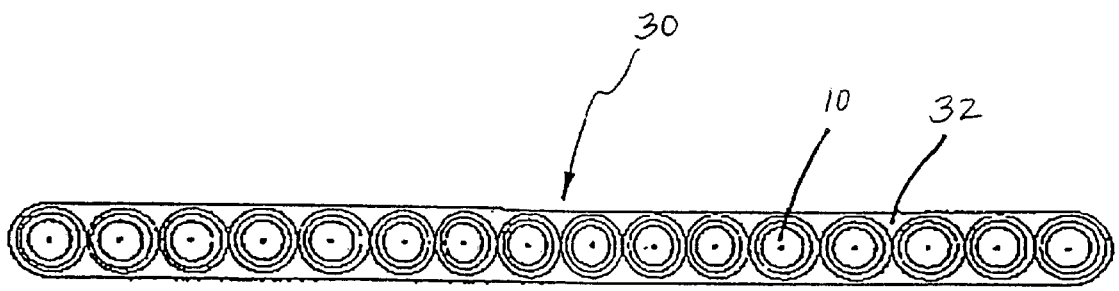
FIG. 3 is a cross-sectional view of a fiber optic ribbon of the present invention.

One such embodiment is illustrated in FIG. 3. As shown, a fiber optic ribbon 30 of the present invention includes a plurality of single or multi-layered optical fibers 10 substantially aligned relative to one another in a substantially planar relationship and encapsulated by matrix 32. By substantially planar, it is intended that optical fibers 10 are not displaced from a common plane by a distance of more than about one-half the diameter thereof. By substantially aligned, it is intended that the optical fibers 10 are generally parallel with other optical fibers along the length of the fiber optic ribbon 30. In FIG. 3, the fiber optic ribbon 30 contains sixteen (16) optical fibers 10; however, it should be apparent to those skilled in the art that any number of optical fibers 10 (e.g., two or more) may be employed to form fiber optic ribbon 30 disposed for a particular use.

The fiber optic ribbons of the present invention may be encapsulated by the matrix 32 in any known configuration (e.g., edge-bonded ribbon, thin-encapsulated ribbon, thick-encapsulated ribbon, or multi-layer ribbon) by conventional methods of making fiber optic ribbons.

Basically, the fiber optic ribbon is prepared by standard methods. For example, upon alignment of a plurality of substantially planar optical fibers, a matrix composition (similar to secondary coatings as described above) can be applied and cured according to known methods of preparing optical fiber ribbons as described in U.S. Pat. No. 4,752,112 to Mayr and U.S. Pat. No. 5,486,378 to Oestreich et al., which are hereby incorporated by reference. Alternatively, the secondary coating can be dissolved with a solvent and, while still wet, the plurality of optical fibers can be brought together before the wet coatings re-polymerize, thereby joining the plurality of fibers together in the substantially planar, substantially aligned relationship.

Although not shown, one of skill in the art should readily appreciate that fibers of the present invention can be utilized in fiber bundles, such as blown fiber subunits, which contain a plurality of substantially aligned optical fibers and a matrix encapsulating the plurality of optical fibers. Fiber bundles differ from ribbons by lacking a substantially planar arrangement of the plurality of optical fibers therein. An exemplary construction of such subunits is disclosed in U.S. Pat. No. 5,046,815 to Cain et al., which is hereby incorporated by reference. The fiber bundle can be prepared in much the same manner as the fiber optic ribbon.

EXAMPLES

The following examples are provided to illustrate embodiments of the present invention, but they are by no means intended to limit its scope.

Example 1

Preparation of Primary and Secondary Coating Compositions

Primary and secondary coating compositions were prepared with the components listed in Table 1 below using commercial blending equipment. The oligomer and monomer components were weighed and then introduced into a heated kettle and blended together at a temperature within the range of from about 50° C. to 65° C. Blending was continued until a homogenous mixture was obtained. Next, the photoinitiators were individually weighed and separately introduced into the homogeneous solution while blending. Any additives were weighed and then introduced into the solution while blending. Blending was continued until a homogeneous solution was again obtained.

The weight percentage of individual components is based on the total weight of the monomers, oligomers, and photoinitiators, which form the base composition. As indicated above, any additives were subsequently introduced into the base composition, as measured in parts per hundred (pph).

TABLE 1

Components for Primary and Secondary Coating Compositions

| Component | Primary Coating | Test Secondary Coating | Control Secondary Coating |
|---|---|---|---|
| Oligomers | aliphatic urethane acrylate, BR 3731 (52%) | urethan acrylate oligomer, KWS4131 (10%) | urethan acrylate oligomer, KWS4131 (10%) |
| Monomers | ethoxylated nonylphenol monoacrylate, Photomer 4003 (45%) | bisphenol A epoxy diacrylate, Photomer 3016 (5%) ethoxylated bisphenol A diacrylate, Photomer 4028 (82%) | bisphenol A epoxy diacrylate, Photomer 3016 (5%) ethoxylated bisphenol A diacrylate, Photomer 4028 (82%) |
| Photoinitiators | Irgacure 819 (1.5%) Irgacure 184 (1.5%) | Lucerin TPO (1.5%) Irgacure 184 (1.5%) | Irgacure 819 (1.5%) Irgacure 184 (1.5%) |
| Additives | Irgonox 1035 (1 pph) 1,4 bis(trimethoxysilyl ethyl)benzene (2 pph) 3-mercaptopropyl trimethoxysilane (0.3 pph) | Irgonox 1035 (0.5 pph) | Irgonox 1035 (0.5 pph) |

Of the components listed in Table 1 above, BR3731 is an aliphatic urethane acrylate oligomer available from Bomar Specialty Chemical (Winsted, Conn.), KWS is a urethane acrylate oligomer also available from Bomar Specialty Chemical, Photomer 4003 is an ethoxylated nonylphenol monoacrylate available from Henkel (Gulph Mills, Pa.), Photomer 4028 is an ethoxylated bisphenol A diacrylate available from Henkel, Photomer 3016 is a bisphenol A epoxy diacrylate available from Henkel, Irgacure 184 is an α hydroxy ketonic photoinitiator available from Ciba Specialty Chemical, Irgacure 819 and Irgacure 1850 are BAPO-containing photoinitiators available from Ciba Specialty Chemical, Lucerin TPO is a MAPO-containing photoinitiator available from BASF Corp. (Mount Olive, N.J.), Irgonox 1035 is an anti-oxidant available from Ciba Specialty Chemical, 1,4 bis(trimethoxysilylethyl)benzene is an adhesion promoter available from Gelest (Tullytown, Pa.), and 3-mercaptopropyltrimethoxysilane is an adhesion promoter available from Aldrich Chemical Co. (Milwaukee, Wis.).

Example 2

Analysis of Photoinitiators and Comparison to Mercury D-Bulb Spectral Output Coating formulations listed in Example 1 were diluted using acetonitrile in a 4:1 ratio to reduce viscosity. Diluted samples were spin coated at varied speeds to produce uniform coating layers of reproducible thickness. The films were inspected by UV examination, which showed complete evaporation of the acetonitrile solvent. For analysis, duplicate samples were prepared at each speed, one on fused silica 4" diameter, 0.0396" thick polished rounds and one on a 3" diameter silicon wafer. Samples were kept in the dark until analysis to prevent degradation from room lights. UV measurements were taken at three different locations on the fused silica sample using the Agilent 8453 UV-visible spectrometer using the following instrument conditions:

| | |
|---|---|
| Exposure time: | 0.1 second |
| Interval: | 1 nm |
| Range: | 250 nm to 500 nm |

Placement of the fused silica rounds was checked with a level to ensure no distortion of the sample pathlength due to tilting of the substrate. Prior to sample analysis, the spectrum of each fused silica round was obtained and saved. The blank spectrum was later subtracted from the coated spectrum to eliminate absorption from the glass itself. Reported values are the average of the three UV measurements after subtraction of the glass spectrum.

Film thickness measurements were obtained on the Si wafer samples using the Filmetrics F20 (San Diego, Calif.) thin film measurement system. Measurements were taken at three different locations on each wafer. Reported values, shown in Table 2 below, are the average of the three measurements.

TABLE 2

Integrated Intensity of Thickness-Normalized Absorbance for Coatings

| Sample | Avg. Film Thickness ($\mu$m) | Average Integrated Intensity ($\mu m^{-1}$) |
|---|---|---|
| Primary Coating | 24.91 | 0.155 |
| Primary Coating | 14.80 | 0.156 |
| Primary Coating | 11.66 | 0.155 |
| Test Secondary Coating | 16.03 | 0.129 |
| Test Secondary Coating | 31.1 | 0.119 |
| Test Secondary Coating | 21.14 | 0.126 |

The absorbance data was normalized by dividing by thickness for both the primary and secondary coating. The area below the curve (integrated intensity) was calculated using Galactic Grams32 (Thermo Galactic, Salem, N.H.) for an average of three curves for films with three separate thicknesses. The integration limits were between 360 nm and 420 nm.

The average integrated intensity of the primary coating was 0.155±0.001. The average integrated intensity of the test secondary coating was 0.124±0.005. The average integrated intensity of the test secondary coating is about 80% of the primary coating ±3%.

Figure 4:
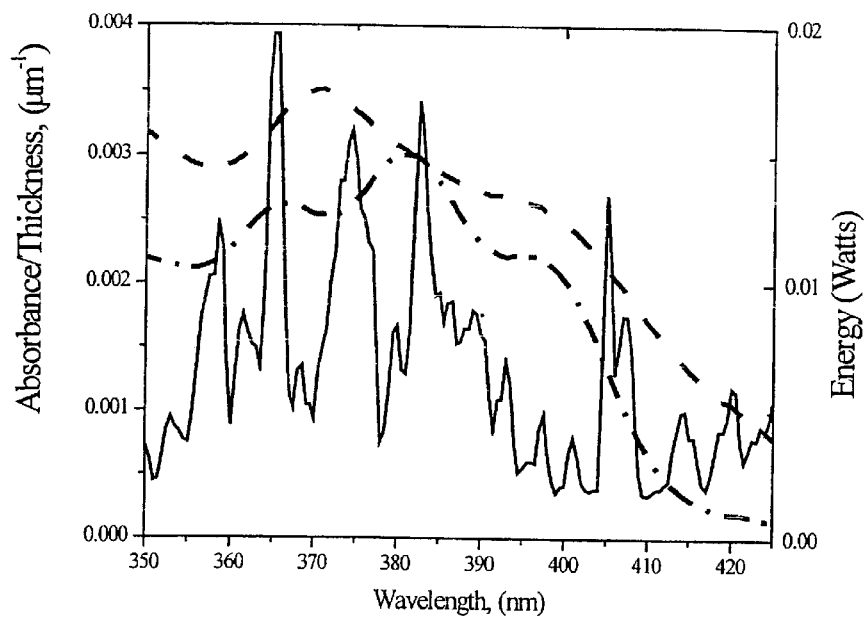
FIG. 4 is a comparison of the absorption (integrated intensity) spectra for bisacyl phosphine oxide ("BAPO") and monoacyl phosphine oxide ("MAPO") over the wavelength of emission for a mercury type D bulb (Fusion UV Systems, Inc.). The BAPO absorption spectra is indicated by the dashed line, whereas the MAPO absorption spectra is indicated by the dot-dashed line.
Figure 5:
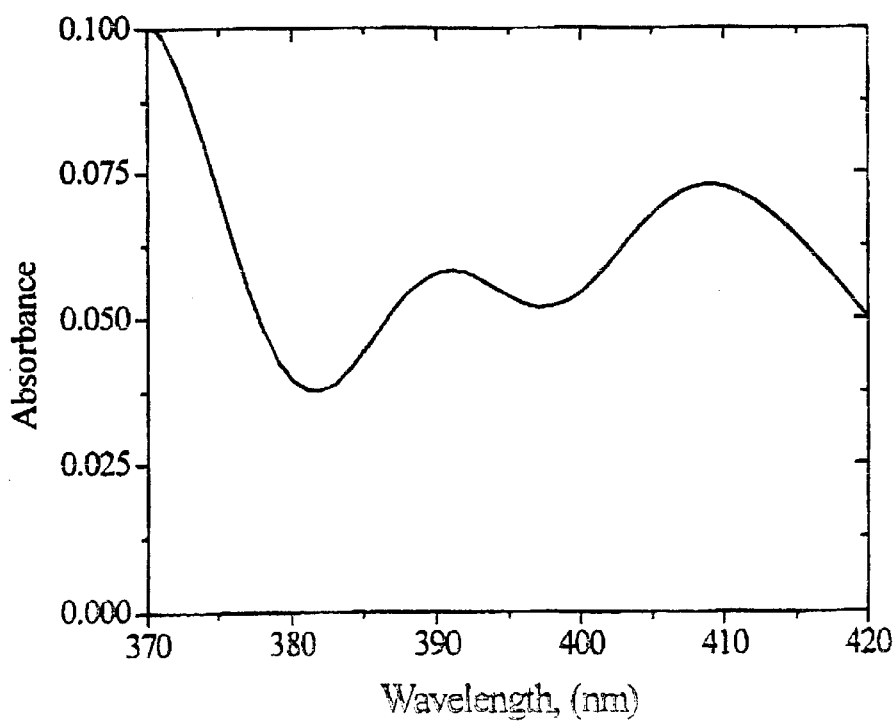
FIG. 5 is a subtractive spectra showing the comparative absorption of BAPO versus MAPO over the wavelength of emission for the mercury D-type bulb.

A comparison of the absorbance spectra for 1.5% BAPO (dashed line, left ordinate) and MAPO (dot-dashed line, left ordinate) in optical fiber coating formulations is illustrated in FIG. 4, along with an overlay of the spectral output of a mercury D-bulb (solid line, right ordinate) from Fusion UV Systems. BAPO, when compared to MAPO, is characterized by a higher integrated intensity over the entire spectra. The differential absorbance characteristics between BAPO and MAPO is further illustrated by a subtractive spectra, shown in FIG. 5. Another important feature, however, is that MAPO displays little or no absorbance within the range of about 410 nm to 420 nm. Thus, BAPO can be used in a primary coating composition and MAPO can be used in a secondary coating composition.

Example 3

Analysis of Relative Cure Speeds for Primary and Secondary Coatings

Combined primary and secondary coatings were tested for their relative cure speed, where relative cure speed is measured according to the following formulae:

$$\text{Relative Cure Speed} = \frac{\text{Percentage Cure}}{\text{Time of Exposure}}$$

where $$\text{Percentage Cure} = \frac{(\text{uncured band ratio} - \text{sample band ratio})}{(\text{uncured band ratio} - \text{fully cured band ratio})} \times 100\%$$

and $$\text{Band Ratio} = \frac{\text{Area of Reactive Peak}}{\text{Area of Internal Standard (Unreactive) Peak}}$$

A primary coating film was applied onto an internal reflectance element and subsequently covered with a glass slide onto which an un-cured secondary coating had been applied. UV irradiation passed through the uncured secondary film before irradiating the primary coating. Primary cure was measured at 6 ms time resolution before and during UV exposure. The results of the relative cure speed tests are reported in Table 3 below.

TABLE 3

Relative Cure Speeds of Primary Coatings with Various Secondary Coatings

| Coatings | Temperature | Cure Speed |
|---|---|---|
| Primary/Control Secondary | 28° C. | 251 |
|  | 50° C. | 179 |
| Primary/Test Secondary | 28° C. | 280 |
|  | 50° C. | 196 |

In relative cure speed measurements, the rate of change of cure as a function of time of UV exposure applied to a formulation is measured. A faster cure speed (higher number) indicates that a formulation will reach the high dose plateau at lower doses than a formulation with a slower cure speed. Since coating operations should occur in the high dose plateau, it is possible to achieve faster processing speeds (i.e., lower dose) to achieve the same degree of cure. As shown in Table 3 above, the relative cure speed of the test combination (Primary/Test Secondary) demonstrated an approximate 10 percent faster cure speed. The cure speed test also shows that the temperature of the coatings affects their cure speed.

Example 4

Preparation of Optical Fibers

Compositions prepared in Example 1 were used as primary and secondary coating materials applied to drawn glass fibers subsequent to cooling. A glass fiber, having a diameter of about 125 $\mu$m, was introduced into a container of the primary coating composition as listed in Table 1. As the coated fiber was removed from the container, the thickness of the primary coating composition was adjusted to about 32.5 $\mu$m by passing the coated fiber through a die. The coated fiber was then cured with ultraviolet radiation at a various dose level using a D bulb (Fusion UV Systems, Inc.) and at constant draw conditions. After curing, each coated fiber was drawn through a second coating container holding a secondary coating composition. As the coated fiber was removed from the second coating chamber, the thickness of the secondary coating composition was adjusted to about 27.5 $\mu$m by passing the coated fiber through a die. The coated fiber was then cured with ultraviolet radiation, again at various dose levels and constant draw conditions, to produce an optical fiber having a diameter of about 245+10 $\mu$m.

Figure 6:
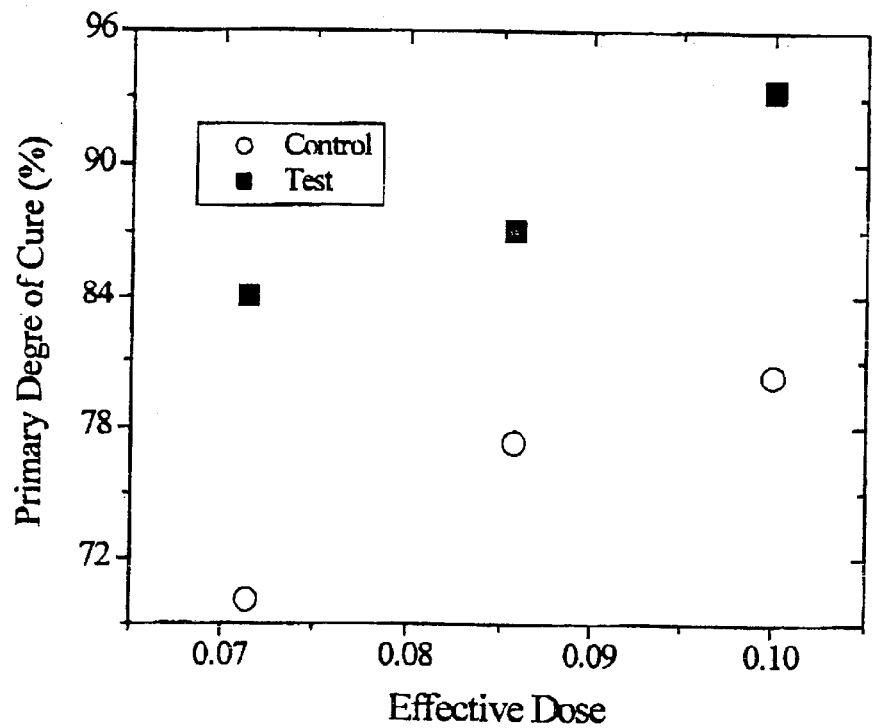
FIG. 6 is a graph illustrating the primary degree of cure versus effective dose for optical fibers prepared using the same primary coatings and either a test or control secondary coating.

Shown in FIG. 6 is the data for each fiber (Primary/Control Secondary and Primary/Test Secondary), plotting the primary degree of cure against the effective dose. The effective dose for the primary coating is calculated according to the formula:

Effective Dose=(No. Primary Lamps+α(No. Secondary Lamps))/Draw Speed where $\alpha$ is a constant between 0 and 1, which allows for consideration of the effect on the primary degree of cure by the secondary lamps. The relative primary degree of cure was determined by depletion of acrylate groups as determined via Fourier Transform InfraRed Spectroscopy using standard attenuated total internal reflection methods typically used in coatings industry. Other methods which measure the relative level of cure of the coating may also be used to determine improvement of cure.

Comparing the results obtained for the primary degree of cure, the control secondary composition illustrated a 10 percent lower primary degree of cure. As noted in Table 1, the control secondary composition contained the identical photoinitiator components as the primary composition. Thus, where the photoinitiator of the secondary composition allows for increased curing of the primary coating during subsequent UV exposure, the primary degree of cure can be expected to increase dramatically.

Example 5

Preparation of Optical Fibers using Cooling Nitrogen Gas

Figure 7:
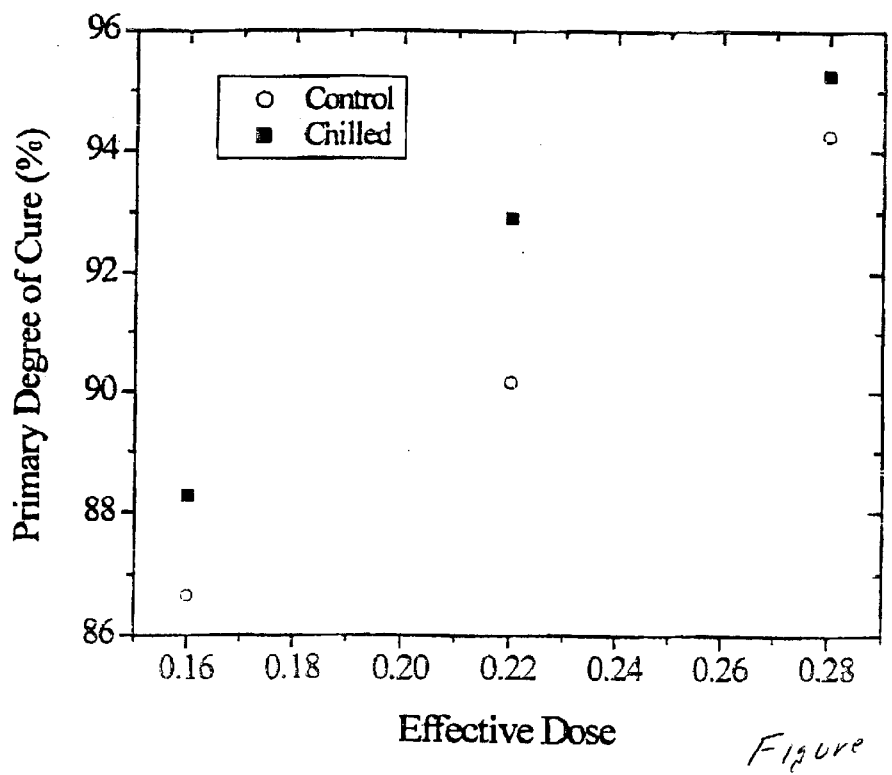
FIG. 7 is graph illustrating the primary degree of cure versus effective dose for optical fibers prepared with or without introduction of cold nitrogen during the primary curing cycle.

An optical fiber was prepared according to the process described in Example 4, except that room temperature nitrogen was substituted with chilled nitrogen and the draw speed was reduced. Chilled nitrogen was introduced by providing a source of liquid nitrogen (in a dewar) in communication with the primary irradiator tube. As shown in FIG. 7, the chilled nitrogen enhanced the primary degree of cure for the test fiber.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. An optical fiber comprising:
   a fiber comprising at least a core;
   a primary coating substantially encapsulating the fiber, the primary coating being the cured product of a first polymerizable composition comprising a first photoinitiator which absorbs light within a range of the UV spectrum; and
   a secondary coating substantially encapsulating the primary coating on the fiber, the secondary coating being the cured product of a second polymerizable composition comprising a second photoinitiator which also absorbs light within the range of the UV spectrum,
   wherein an average integrated intensity for the second photoinitiator is 95% or less of the average integrated intensity for the first photoinitiator over the range of the UV spectrum between about 360 and 420 nm.

2. The optical fiber according to claim 1, wherein the average integrated intensity for the second photoinitiator is 85% or less of the average integrated intensity for the first photoinitiator between about 360 to 420 nm.

3. The optical fiber according to claim 2, wherein the first photoinitiator comprises a bisacylphosphine oxide.

4. The optical fiber according to claim 2, wherein the second photoinitiator has an average integrated intensity greater than about $0.001/\mu m$ within the range of about 360 to about 410 nm.

5. The optical fiber according to claim 4, wherein the second photoinitiator comprises a monoacylphosphine oxide.

6. The optical fiber according to claim 1, wherein the second photoinitiator has an average integrated intensity greater than about $0.001/\mu m$ within the range of about 360 to about 410 nm.

7. The optical fiber according to claim 6, wherein the second photoinitiator comprises a monoacylphosphine oxide.

8. The optical fiber according to claim 1, wherein the average integrated intensity for the second photoinitiator is 90% or less of the average integrated intensity for the first photoinitiator over at least the portion of the range of the UV spectrum.

9. The optical fiber according to claim 1, wherein the average integrated intensity for the second photoinitiator is 85% or less of the average integrated intensity for the first photoinitiator over at least the portion of the range of the UV spectrum.

10. The optical fiber according to claim 1, wherein the average integrated intensity for the second photoinitiator is 80% or less of the average integrated intensity for the first photoinitiator over at least the portion of the range of the UV spectrum.

11. A method of making an optical fiber comprising:
first coating a fiber with a first polymerizable composition comprising a first photoinitiator which absorbs light within a range of the UV spectrum;
second coating the coated fiber with a second polymerizable composition comprising a second photoinitiator which also absorbs light within the range of the UV spectrum, wherein an average integrated intensity for the second photoinitiator is 95% or less of the average integrated intensity for the first photoinitiator over the range of the UV spectrum between about 360 and 420 nm; and
exposing the twice coated fiber to a UV light source under conditions effective to promote curing of the first and second polymerizable compositions, thereby forming an optical fiber.

12. The method according to claim 11, wherein the average integrated intensity for the second photoinitiator is 85% or less of the average integrated intensity for the first photoinitiator between about 360 to 420 nm.

13. The method according to claim 12, wherein the first photoinitiator comprises a bisacylphosphine oxide.

14. The method according to claim 12, wherein the second photoinitiator has an average integrated intensity greater than about $0.00/\mu m$ within the range of about 360 to about 410 nm.

15. The method according to claim 14, wherein the second photoinitiator comprises a monoacylphosphine oxide.

16. The method according to claim 11, wherein the second photoinitiator has an average integrated intensity greater than about $0.00/\mu m$ within the range of about 360 to about 410 nm.

17. The method according to claim 16, wherein the second photoinitiator comprises a monoacylphosphine oxide.

18. The method according to claim 11, wherein said exposing the twice coated fiber is carried out following said second coating, said method further comprising prior to said second coating:
exposing the once coated fiber to a UV light source under conditions effective to promote curing of the first polymerizable composition.

19. The method according to claim 18, wherein the UV light source is the same for each said exposing.

20. The method according to claim 11 further comprising:
cooling the first polymerizable composition.

21. The method according to claim 20, wherein said cooling comprises:
passing a gas over the coated fiber under conditions effective to cool the temperature of the first polymerizable composition.

22. The method according to claim 21, wherein the gas is substantially inert with respect to components of the first polymerizable composition.

23. The method according to claim 20 wherein said cooling is carried out during said exposing the once coated fiber.

24. The method according to claim 11 further comprising:
inhibiting exposure of the first polymerizable composition or the primary coating to infrared energy during said exposing the twice coated fiber.

25. The method according to claim 24, wherein said inhibiting comprises:
providing an infrared filter between the UV light source and the twice coated fiber.

26. The method according to claim 24, wherein said inhibiting comprises:
directing reflected UV light from at least one dichroic mirror toward the twice coated fiber, wherein the dichroic mirror absorbs non-UV light.

27. The method according to claim 18 further comprising:
inhibiting exposure of the first polymerizable composition or the primary coating to infrared energy during said exposing the once coated fiber.

28. The method according to claim 27, wherein said inhibiting comprises:
providing an infrared filter between the UV light source and the twice coated fiber.

29. The method according to claim 27, wherein said inhibiting comprises:
directing reflected UV light from at least one dichroic mirror toward the twice coated fiber, wherein the dichroic mirror absorbs non-UV light.

30. The method according to claim 11, wherein the average integrated intensity for the second photoinitiator is 90% or less of the average integrated intensity for the first photoinitiator over at least the portion of the range of the UV spectrum.

31. The method according to claim 11, wherein the average integrated intensity for the second photoinitiator is 85% or less of the average integrated intensity for the first photoinitiator over at least the portion of the range of the UV spectrum.

32. The method according to claim 11, wherein the average integrated intensity for the second photoinitiator is 80% or less of the average integrated intensity for the first photoinitiator over at least the portion of the range of the UV spectrum.

33. An optical fiber made in accordance with claim 11.

34. An optical fiber made in accordance with claim 18.

35. A method of increasing the degree of cure for a primary coating on an optical fiber, said method comprising:

coating an optical fiber with first and second polymerizable compositions, the first polymerizable composition comprising a first photoinitiator which absorbs light within a range of the UV spectrum and the second polymerizable composition a second photoinitiator which absorbs light within the range of the UV spectrum, wherein an average integrated intensity for the second photoinitiator is 95% or less of the average integrated intensity for the first photoinitiator over the range of the UV spectrum between about 360 nm and about 420 nm; and exposing the twice coated optical fiber to a UV light source under conditions effective to promote curing of the first and second polymerizable compositions, wherein the differential integrated intensity for the first and second photoinitiators increases the exposure of the first polymerizable composition to UV light, thereby increasing the degree of cure for the primary coating.

36. The method according to claim 35, wherein the first photoinitiator has an average integrated intensity greater than about $0.001/\mu m$ within the range of about 360 to about 420 nm.

37. The method according to claim 36, wherein the first photoinitiator comprises a bisacylphosphine oxide.

38. The method according to claim 36, wherein the second photoinitiator has an average integrated intensity greater than about $0.001/\mu m$ within the range of about 360 to about 410 nm.

39. The method according to claim 38, wherein the second photoinitiator comprises a monoacylphosphine oxide.

40. The method according to claim 35, wherein the second photoinitiator has an average integrated intensity greater than about $0.001/\mu m$ within the range of about 360 to about 410 nm.

41. The method according to claim 40, wherein the second photoinitiator comprises a monoacylphosphine oxide.

42. The method according to claim 35, wherein said exposing the twice coated fiber is carried out after coating with the second polymerizable composition, said method further comprising after coating with the first polymerizable composition:

exposing the once coated fiber to a UV light source under conditions effective to promote curing of the first polymerizable composition.

43. The method according to claim 42, wherein the UV light source is the same for each said exposing.

44. The method according to claim 35 further comprising:

cooling the first polymerizable composition.

45. The method according to claim 44, wherein said cooling comprises:

passing a gas over the coated fiber under conditions effective to cool the temperature of the first polymerizable composition.

46. The method according to claim 45, wherein the gas is substantially inert with respect to components of the first polymerizable composition.

47. The method according to claim 44 wherein said cooling is carried out during said exposing the once coated fiber.

48. The method according to claim 35 further comprising:

inhibiting exposure of the first polymerizable composition or the primary coating to infrared energy during said exposing the twice coated fiber.

49. The method according to claim 48, wherein said inhibiting comprises:

providing an infrared filter between the UV light source and the twice coated fiber.

50. The method according to claim 48, wherein said inhibiting comprises:

directing reflected UV light from at least one dichroic mirror toward the twice coated fiber, wherein the dichroic mirror absorbs non-UV light.

51. The method according to claim 42 further comprising:

inhibiting exposure of the first polymerizable composition or the primary coating to infrared energy during said exposing the once coated fiber.

52. The method according to claim 51, wherein said inhibiting comprises:

providing an infrared filter between the UV light source and the twice coated fiber.

53. The method according to claim 51, wherein said inhibiting comprises:

directing reflected UV light from at least one dichroic mirror toward the twice coated fiber, wherein the dichroic mirror absorbs non-UV light.

54. The method according to claim 35, wherein the average integrated intensity for the second photoinitiator is 90% or less of the average integrated intensity for the first photoinitiator over at least the portion of the range of the UV spectrum.

55. The method according to claim 35, wherein the average integrated intensity for the second photoinitiator is 85% or less of the average integrated intensity for the first photoinitiator over at least the portion of the range of the UV spectrum.

56. The method according to claim 35, wherein the average integrated intensity for the second photoinitiator is 80% or less of the average integrated intensity for the first photoinitiator over at least the portion of the range of the UV spectrum.

57. An optical fiber ribbon or bundle comprising:

a plurality of substantially aligned optical fibers according to claim 1 and a matrix encapsulating the plurality of optical fibers.

* * * * *

UNITED STATES PATENT AND TRADEMARK OFFICE
CERTIFICATE OF CORRECTION

PATENT NO.    : 6,628,875 B2
DATED         : September 30, 2003
INVENTOR(S)   : Linda S. Baker et al.

It is certified that error appears in the above-identified patent and that said Letters Patent is hereby corrected as shown below:

Title page,
Item [56], References Cited, FOREIGN PATENT DOCUMENTS,
"EP 0646552 A2    4/1995" should be -- EP 0646552 A2    9/1994 --
"EP 1004551 A1    5/2000" should be -- EP 1004551 A1    1/1998 --
"EP 1216969 A1    6/2002" should be -- EP 1216969 A1    11/2001 --

Column 15,
Line 62, "than about 0.00/$\mu$m within the range of about 360 to about" should be
-- than about 0.001/$\mu$m within the range of about 360 to about --
Line 68, "than about 0.00/$\mu$m within the range of about 360 to about" should be
-- than about 0.001/$\mu$m within the range of about 360 to about"

Signed and Sealed this

Fifth Day of July, 2005

JON W. DUDAS
*Director of the United States Patent and Trademark Office*